(12) United States Patent
Uchino

(10) Patent No.: US 6,712,725 B2
(45) Date of Patent: Mar. 30, 2004

(54) HYDRAULIC CONTROL APPARATUS OF AN AUTOMATIC TRANSMISSION

(75) Inventor: Satoshi Uchino, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,391

(22) Filed: Jun. 13, 2002

(65) Prior Publication Data

US 2002/0189384 A1 Dec. 19, 2002

(30) Foreign Application Priority Data

Jun. 15, 2001 (JP) ........................................ 2001-180976

(51) Int. Cl.[7] .......................... F16H 31/00; F16H 61/00
(52) U.S. Cl. ..................... 475/119; 475/120; 475/127; 477/177; 477/122; 477/79
(58) Field of Search ................................. 475/119, 120, 475/122, 127, 128; 477/117, 121, 122, 123, 156, 158, 79, 63, 65; 74/335, 334

(56) References Cited

U.S. PATENT DOCUMENTS

| | | | | |
|---|---|---|---|---|
| 3,589,483 A | * | 6/1971 | Smith | ........................ 192/3.52 |
| 4,495,838 A | * | 1/1985 | Gooch | ......................... 477/116 |
| 4,638,690 A | * | 1/1987 | Hattori et al. | ............... 477/125 |
| 4,981,052 A | * | 1/1991 | Gierer | ......................... 477/125 |
| 5,079,973 A | * | 1/1992 | Ookubo et al. | .............. 477/126 |
| 5,083,646 A | * | 1/1992 | Takeuchi et al. | ............ 192/3.57 |

FOREIGN PATENT DOCUMENTS

| JP | 59120524 A | * 7/1984 | ........... B60K/20/16 |
|---|---|---|---|
| JP | 2000-55184 | 2/2000 | |

* cited by examiner

*Primary Examiner*—Tisha D Lewis
(74) *Attorney, Agent, or Firm*—McGinn & Gibb, PLLC

(57) ABSTRACT

A hydraulic control apparatus for an automatic transmission having a plurality of transmission gear trains. The hydraulic control apparatus performs a gear shift operation by a select actuator and a shift actuator. When the shift actuator is actuated to a neutral position, an oil pressure is supplied from a shift position detection valve toward the select actuator which selects a gear shift stage switching mechanism. When the oil pressure is supplied by a normally open solenoid valve, and also a reverse gear stage switching mechanism is selected, a pilot pressure is supplied from a select position detection valve to a forcible reverse shift valve. Thus, one oil pressure supplied to the shift actuator is shut off. When the shift actuator actuates the reverse gear stage switching mechanism, the shift position detection valve is actuated so that the oil pressure from the select position detection valve is supplied to an input clutch.

2 Claims, 8 Drawing Sheets

HYDRAULIC CONTROL APPARATUS OF AN AUTOMATIC TRANSMISSION

BACKGROUND OF THE INVENTION

1. Field of the Invention

The present invention relates to a hydraulic control apparatus of an automatic transmission mounted on a motor vehicle, and more particularly to a technique applied to the automatic transmission having a plurality of transmission gear trains.

The present application claims priority from Japanese Patent Application No. 2001-180976, the disclosure of which is incorporated herein by reference for all purposes.

2. Description of the Related Art

A manual transmission (MT) executing a gear shift operation by a manual operation of a driver includes an input shaft connected to an engine and to which a plurality of drive gears are attached, and an output shaft connected to a drive wheel and to which a plurality of driven gears forming pairs together with the drive gears are attached, in which a plurality of transmission gear trains are provided between the input and output shafts. In the MT, a gear shift operation, i.e., a gear change is performed by manually switching a switching mechanism such as a synchromeshed mechanism in order to switch a gear train, that is, a gear pair among a plurality of the transmission gear trains after disengaging a clutch at a time of the gear change, thereafter connecting the clutch.

When the gear change and clutch operation are performed by using a shift actuator actuated by an oil pressure, an automatic transmission can be obtained whose structure is based on a manual transmission. An automatic transmission of a type having a plurality of transmission gear trains (Automated Manual Transmission, hereinafter referred to as an AMT) has some advantages in comparison with an ordinary torque converter type automatic transmission (AT) having a planetary gear in an automatic gear change mechanism. Namely, it is possible to reduce the number of parts, thereby lightening it, and the transmitting efficiency of a drive system is higher than that of the automatic transmission of the ordinary torque converter type.

For example, Japanese Patent Application Laid Open No. 2000-55184 discloses such an AMT-type automatic transmission which has a starting clutch, that is, an input clutch for switching over from an engaged state to disengaged state and vice versa between a crank shaft and an input shaft of the engine, and a bypass clutch of a hydraulic multi-disc type for preventing a torque disconnection when transmitting a torque from the input shaft to the output shaft at the time of a gear shift operation.

The AMT disclosed in this publication performs such a fail safe system that a first gear stage is forcibly setted by a return spring when an oil pump constituting an oil pressure source fails. In the conventional fail safe system, however, when a solenoid valve becomes uncontrollable as a result of an electrical system failure, a gear change to a first gear stage is forcibly made even while a vehicle is traveling in a fifth gear stage with a wet multi-disc clutch engaged, and thus it results in that not only a sudden drop in speed is caused and thereby the vehicle become unstable, but also such problems as wear or scorching of the starting clutch occurs in case of a half clutch position. Furthermore, as the conventional fail safe system is directed only for a forward travel, the fail safe system in a reverse travel has not ever been considered to be applied.

SUMMARY OF THE INVENTION

An object of the present invention is to enable a gear shift to a transmission gear train used for backward moving to be reliably performed without gear clashes or interlocking when a reverse range is selected by a manual operation, even if an electrical system failure occurs in an automatic transmission having a plurality of transmission gear trains.

A hydraulic control circuit of the present invention has an input shaft on which a plurality of drive gears are provided, an output shaft on which a plurality of driven gears are provided to form the transmission gear trains by meshing with the drive gears, and a plurality of switching mechanisms for switching transmission gear trains transmitting drive power from the input shaft to the output shaft. As features of the present invention, it comprises an input clutch for engaging and disengaging between an engine and the input shaft, a select actuator for selecting either one of the plurality of switching mechanisms to perform a switching operation, a shift actuator for performing the switching operation of the selected switching mechanism, and a select position detection valve for opening and closing an oil passage under an engagement with the select actuator. It further comprises a shift position detection valve for switching the oil passages under an engagement with the shift actuator, the shift position detection valve supplying oil pressure for switching into a reverse gear stage to the select actuator when the shift actuator is actuated to a neutral position, and a forcible reverse shift valve for setting the shift actuator at a reverse gear stage by the oil pressure from the select position detection valve when the select actuator is switched to a reverse position. Thus, the oil pressure is supplied to the input clutch via the shift position detection valve when the reverse gear stage is setted by the shift actuator.

The hydraulic control circuit of the present invention further comprises a normally open solenoid valve for controlling a supply of the oil pressure to allow the select actuator to be actuated to the reverse position, and
a normally closed solenoid valve for controlling supply of the oil pressure to allow the select actuator to be actuated to a forward travel position.

According to the present invention, in the case that the selector lever is setted at the reverse gear stage, it is possible to actuate the select actuator to the reverse position after the shift actuator is actuated to the neutral position, and then to engage the input clutch after the shift actuator is actuated to the reverse position, thereby enabling switching to a reverse gear stage to be reliably performed without the gear clashes or interlocking.

Even in a case where a solenoid valve for switching the transmission gear train does not operate due to the electrical system failure, it is possible to actuate the select actuator to the reverse position after the shift actuator is actuated to the neutral position, and then to engage the input clutch after the shift actuator is actuated to the reverse position only by a manual operation, that is, by only setting the select lever at the reverse gear stage, thereby enabling the switching to the reverse gear stage to be reliably performed without the gear clashes or interlocking.

DESCRIPTION OF THE PREFERRED EMBODIMENTS

An embodiment of the present invention will be described hereinafter with reference to the drawings.

Figure 1:
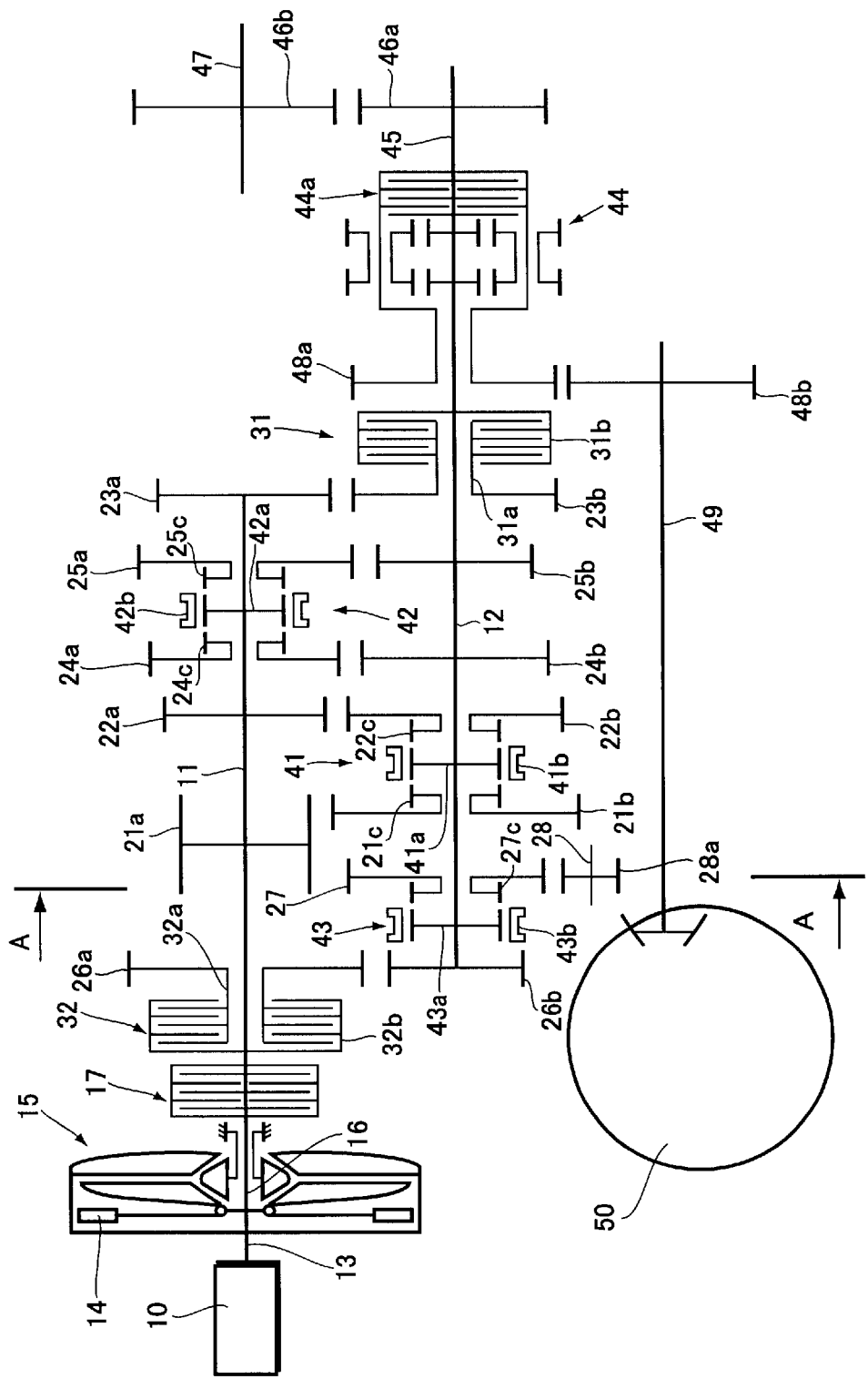
FIG. 1 is a skeleton view showing an automatic transmission having a hydraulic control apparatus as a first embodiment of the present invention.
Figure 2:
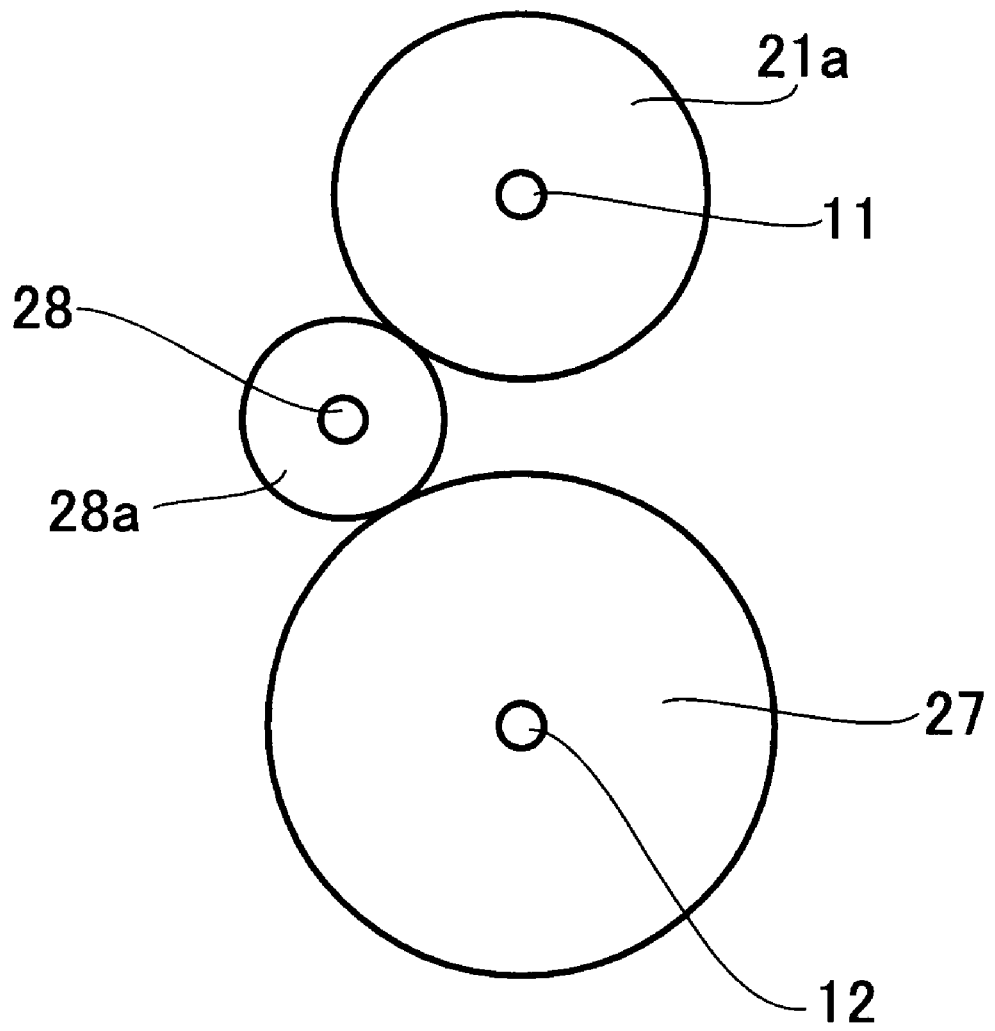
FIG. 2 is the skeleton view showing a meshing state of gears, as seen along the line A—A in FIG. 1.

FIG. 1 is a skeleton view showing an automatic transmission having a hydraulic control apparatus as a first embodiment of the present invention, and FIG. 2 is a skeleton view showing a meshing state of gears, as seen along the line A—A in FIG. 1. The automatic transmission has an input shaft 11 coupled with an engine 10, and an output shaft 12 which lies in parallel with the input shaft 11 and is coupled with driving wheels. The input shaft 11 and the output shaft 12 are assembled within a transmission case (not shown) so as to face in a forward travel direction of a motor vehicle. The automatic transmission can be applied to a four-wheel drive vehicle and disposed in a longitudinal direction of the vehicle.

A torque converter 15 having a lockup clutch 14 is coupled to a crank shaft 13 of the engine 10. A multi-disc type starting clutch, namely, an input clutch 17 is provided to engage or disengage between a turbine shaft 16, which is the output shaft of the torque converter 15, and an input shaft 11. First to third speed drive gears 21a to 23a are fixed to the input shaft 11, and fourth to sixth speed drive gears 24a to 26a are rotatably mounted with respect to the input shaft 11. The output shaft 12 has first to third speed driven gears 21b to 23b rotatably mounted thereon, and fourth to sixth speed driven gears 24b to 26b fixed thereto, and thus the driven gears mesh with corresponding drive gears 21a to 26a, respectively, to form transmission gear trains in a forward travel stage.

A driven gear 27 for a backward travel is rotatably mounted on the output shaft 12. As shown in FIGS. 1 and 2, an idler shaft 28, which is disposed in parallel with and rotatably on the output shaft 12, is provided with an idler gear 28a that meshes with the first speed drive gear 21a and the driven gear 27 for the backward travel. Thus, the first speed drive gear 21a and the driven gear 27 for the backward travel mesh with one another via the idler gear 28a, so that the transmission gear train of the reverse gear is formed. In the other words, the drive gear 21a is employed not only as the first speed drive gear, but also as the reverse drive gear.

A first bypass clutch 31 is provided on the output shaft 12. The first bypass clutch 31 has a clutch hub 31a fixed to the third speed driven gear 23b, and a clutch drum 31b fixed to the output shaft 12. As a result of pressurizing a plurality of clutch discs provided one by one on the clutch hub 31a and clutch drum 31b, the bypass clutch 31 enters an engaged state, or a power transmission state, so that the drive power of the input shaft 11 can be transmitted to the output shaft 12 via a third speed transmission gear train.

Further, a second bypass clutch 32 is provided on the input shaft 11. The second bypass clutch 32 has a clutch hub 32a fixed to the sixth speed drive gear 26a, and a clutch drum 32b fixed to the input shaft 11. As a result of pressurizing a plurality of clutch discs provided one after another on the clutch hub 32a and clutch drum 32b, the bypass clutch 32 enters an engaged state, or a power transmission state, so that the drive power of the input shaft 11 can be transmitted to the output shaft 12 via a sixth speed transmission gear train.

Transmission gear trains are therefore produced by enabling each of the drive gears 21a to 26a to mesh with the corresponding respective driven gears 21b to 26b, and 27, and thus a gear shift operation can be performed by switching the transmission gear train for transmitting the drive power. A first switching mechanism 41 for switching the transmission gear train to either the first speed or the second speed range is mounted on the output shaft 12, and a second switching mechanism 42 for switching the transmission gear train to either the fourth speed or the fifth speed range is mounted on the input shaft 11. In addition, a third switching mechanism 43 for switching the transmission gear train to a reverse gear stage is mounted on the output shaft 12. Each of the switching mechanisms 41 to 43 forms a synchromesh mechanism. However, the third switching mechanism 43 may be the one that uses a dog clutch mechanism.

The first switching mechanism 41 has a synchronizer hub 41a, which is disposed between the two driven gears 21b, 22b of the first speed and second speed, and fixed to the output shaft 12; and a synchronizer sleeve 41b which continuously meshes with the synchronizer hub 41a. When the synchronizer sleeve 41b is caused to mesh with a spline 21c that is integrally formed with the driven gear 21b, the transmission gear train for transmitting the drive power is set at the first speed range, and conversely, the second speed range is setted when the synchronizer sleeve 41b is meshed with a spline 22c that is integrally formed with the driven gear 22b.

Similarly, the second switching mechanism 42 has a synchronizer hub 42a, which is disposed between the two drive gears 24a, 25a of the fourth speed and the fifth speed ranges, and fixed to the input shaft 11; and a synchronizer sleeve 42b which continuously meshes with the synchronizer hub 42a. When the synchronizer sleeve 42b is meshed with a spline 24c that is integrally formed with the drive gear 24a, the transmission gear train is set at the fourth speed range, and conversely, the fifth speed range is set when meshing the synchronizer sleeve 42b with a spline 25c that is integrally formed with the drive gear 25a.

Furthermore, the third switching mechanism 43 has a synchronizer hub 43a, which is disposed between the drive gear 26b of the sixth speed range and the driven gear 27 for the backward travel, and fixed to the output shaft 12; and a synchronizer sleeve 43b which continuously meshes with the synchronizer hub 43a. When the synchronizer sleeve 43b is meshed with a spline 27c that is integrally formed with the driven gear 27 for the backward travel, the transmission gear train is set to a reverse gear stage, and the drive power of the input shaft 11 is transmitted to the output shaft 12 via the idler gear 28a.

Therefore, switching to the first speed or the second speed range is performed by actuating the synchronizer sleeve 41b of the first switching mechanism 41, and switching to the fourth speed or the fifth speed range is performed by actuating the synchronizer sleeve 42b of the second switching mechanism 42. Further, switching to the reverse gear stage is performed by actuating the synchronizer sleeve 43b of the third switching mechanism 43. Also, switching to the third speed range can be performed by engaging the first bypass clutch 31, and the switching to the sixth speed range by engaging the second bypass clutch 32.

The automatic transmission has the bypass clutches 31, 32 and therefore can perform a gear shift operation while power is being transmitted via the bypass clutches 31, 32 with the input shaft 17 kept in an engaged state, so that torque loss at the time of a gear shift can be prevented.

The automatic transmission has six forward travel transmission stages, where the first to third speed stages constitute a low speed stage group, and the fourth to sixth speed stages constitute a high speed stage group. When a gear shift operation is carried out in the low speed stage group, a torque transmission is performed from the input shaft 11 to the output shaft 12 with the first bypass clutch 31 in an engaged state. On the other hand, when the gear shift operation is carried out in the high speed stage group, the torque transmission is performed with the second bypass clutch 32 in the engaged state. Thus, the torque transmission passages are formed in separate systems through the two bypass clutches 31, 32 according to the transmission gear trains, thereby enabling the torque passing through the bypass clutches 31, 32 at the time of the gear shift operation to be transmitted through closer positions corresponding with the transmission gear train.

A transfer device 44 having a friction clutch 44a is mounted on an end of the output shaft 12, and a rear wheel drive gear 46a is fixed to a transfer output shaft 45 of the transfer device 44. A rear wheel driven gear 46b is fixed to a rear wheel output shaft 47 provided in parallel with the transfer output shaft 45, and as a result of meshing between the rear wheel drive gear 46a and the rear wheel driven gear 46b, the drive power of the transfer output shaft 45 is transmitted to the rear wheel output shaft 47. The rear wheel output shaft 47 is coupled with a rear wheel drive shaft via a rear differential device (not shown), and the rear wheels can thus be driven by the drive power of the rear wheel output shaft 47.

Meanwhile, a front wheel drive gear 48a is rotatably mounted on the output shaft 12, and a front wheel driven gear 48b, which meshes with the front wheel drive gear 48a, is fixed to a front wheel output shaft 49 provided in parallel with the output shaft 12. The front wheel drive gear 48a is coupled to the transfer output shaft 45 via the friction clutch 44a, and it is thus possible to transmit the drive power of the transfer output shaft 45 to the front wheel output shaft 49 by engaging the friction clutch 44a. The front wheel output shaft 49 is coupled to a front wheel drive shaft via a front differential device 50, and the front wheels can thus be driven by the drive power of the front wheel output shaft 49.

An electronic control throttle for adjusting the engine torque and an engine speed is provided on the engine 10, and, normally, an engine control is performed by opening and closing the electronic control throttle through output signals from an electronic control device in accordance with a depressed degree of the accelerator pedal. Further, depending on requirements, the electronic control throttle is capable of performing the engine control by opening and closing thereof on the basis of a map setted in advance in accordance with detected drive states, irrespective of the depressed degree of the accelerator pedal.

Figure 3:
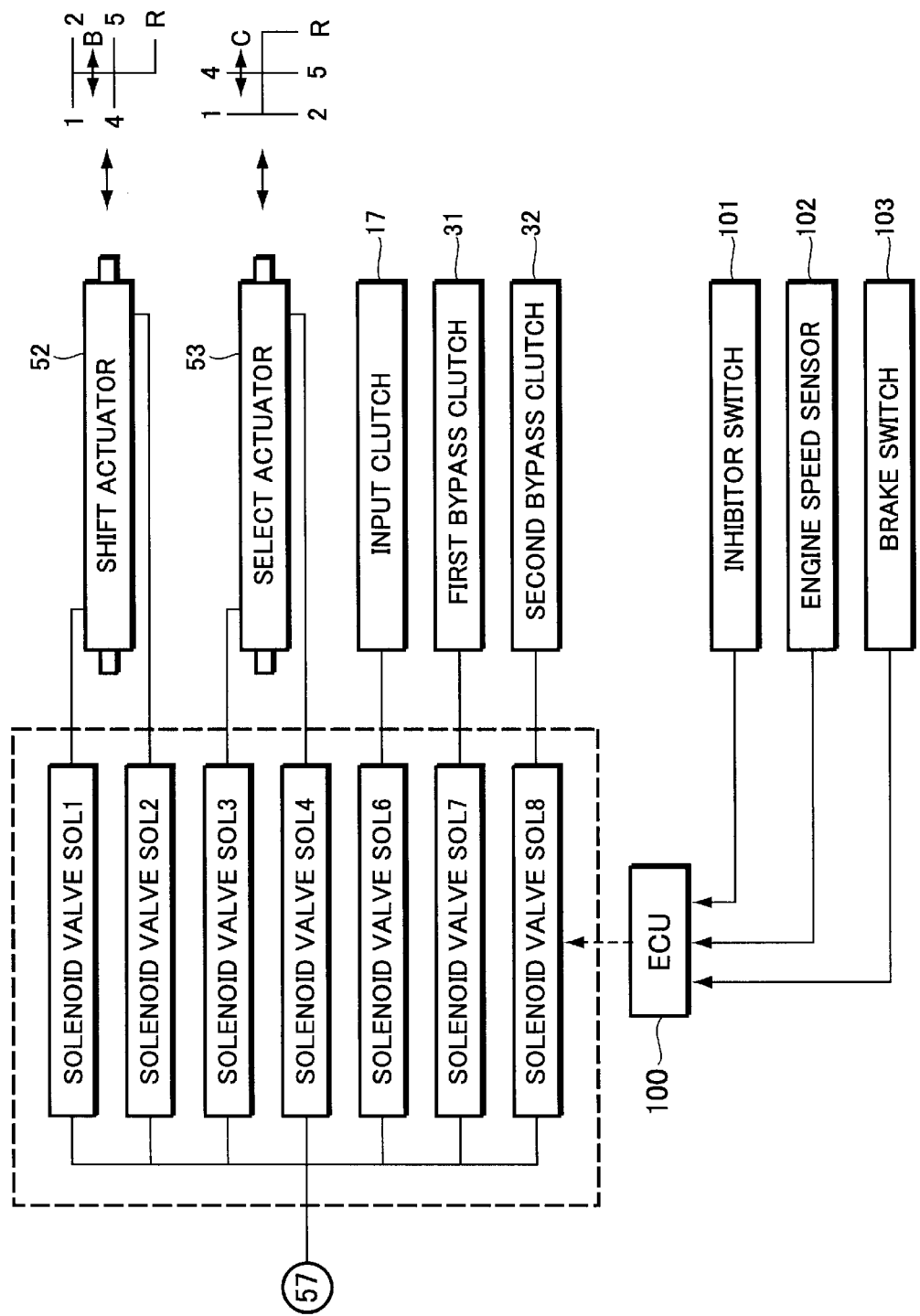
FIG. 3 is a schematic view showing a hydraulic control apparatus.

FIG. 3 is a schematic view showing a hydraulic control apparatus for controlling the operation of the automatic transmission described above. Hereinafter, the operation of the first to third switching mechanisms 41 to 43 will be explained. The automatic transmission selects a transmission gear train for performing a power transmission among a plurality of transmission gear trains, and thus is provided with a shift actuator 52 and a select actuator 53 in order to perform switching actions. The actions of the shift actuator 52 and the select actuator 53 are transmitted as the switching actions to the three switching mechanisms 41 to 43 via a directional converging mechanism (not shown) which has a shift link and a select link.

As shown by an arrow B in FIG. 3, the action of the shift actuator 52 represents the switching of the transmission gear train to either the first or second gear, either the fourth or fifth gear, or the reverse gear. More specifically, this is an action constituting a switching movement in the synchronizer sleeves 41b to 43b.

As shown by an arrow C in FIG. 3, the action of the select actuator 53 represents the selecting of a synchronizer sleeve 41b to 43b for performing the switching action among the three synchronizer sleeves 41b to 43b.

By the shift actuator 52, the first switching mechanism 41 is positioned at any one of a position in which the synchronizer sleeve 41b meshes with the spline 21c to set the first speed range, the position in which the synchronizer sleeve 41b meshes with the spline 22c to set the second speed range, and the neutral position in which there is no meshing with the splines 21c, 22c. The second switching mechanism 42 is positioned at any one of the three positions, i.e., the fourth speed, the fifth speed ranges and the neutral position. Further, the third switching mechanism 43 is positioned at any one of two positions, i.e., the reverse and the neutral position. The actuation of these two actuators 52, 53 is controlled by a hydraulic control apparatus, which also controls an oil pressure with respect to the input clutch 17 and the two bypass clutches 31, 32.

Figure 4:
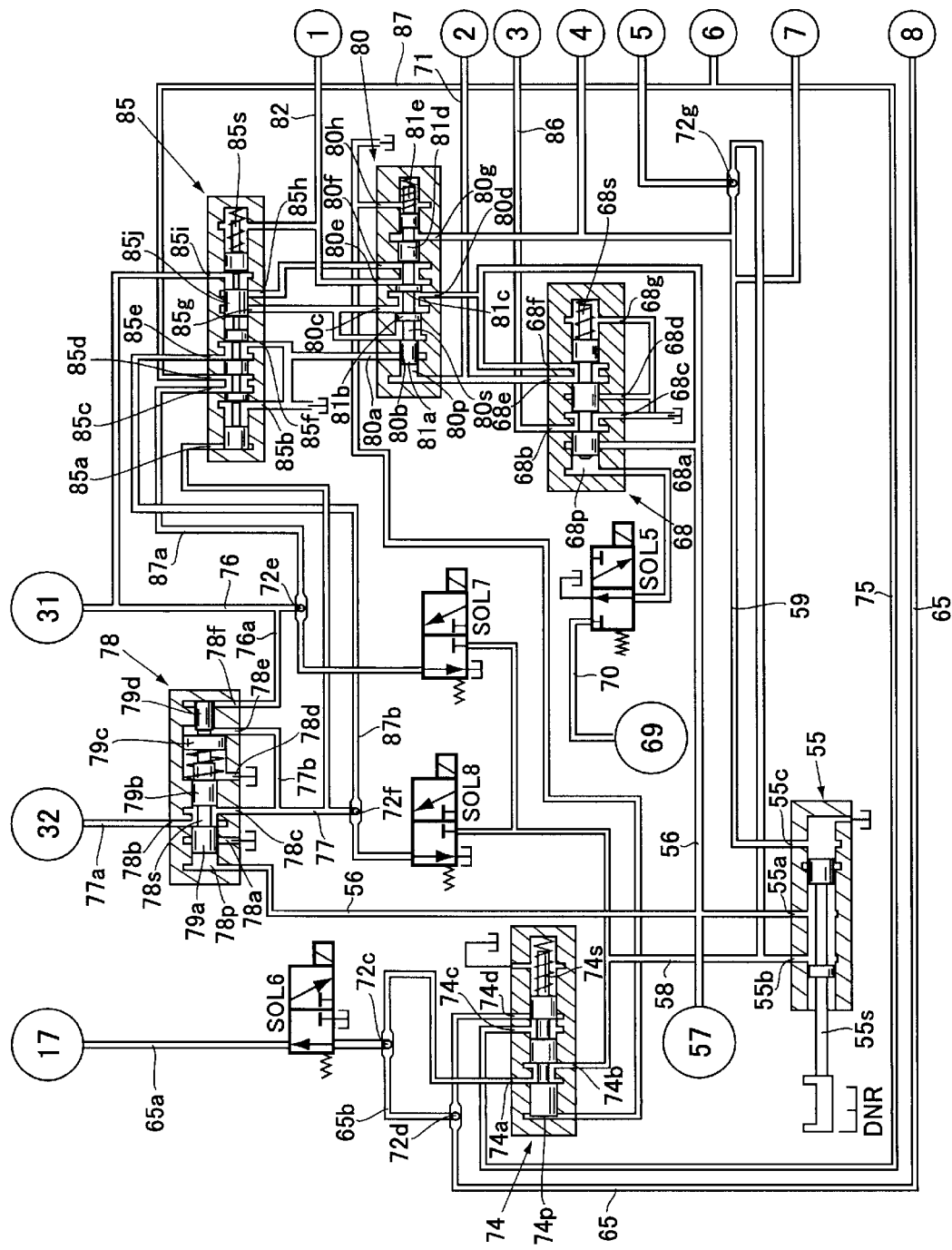
FIG. 4 is a hydraulic circuit diagram showing the hydraulic control apparatus of the automatic transmission.
Figure 5:
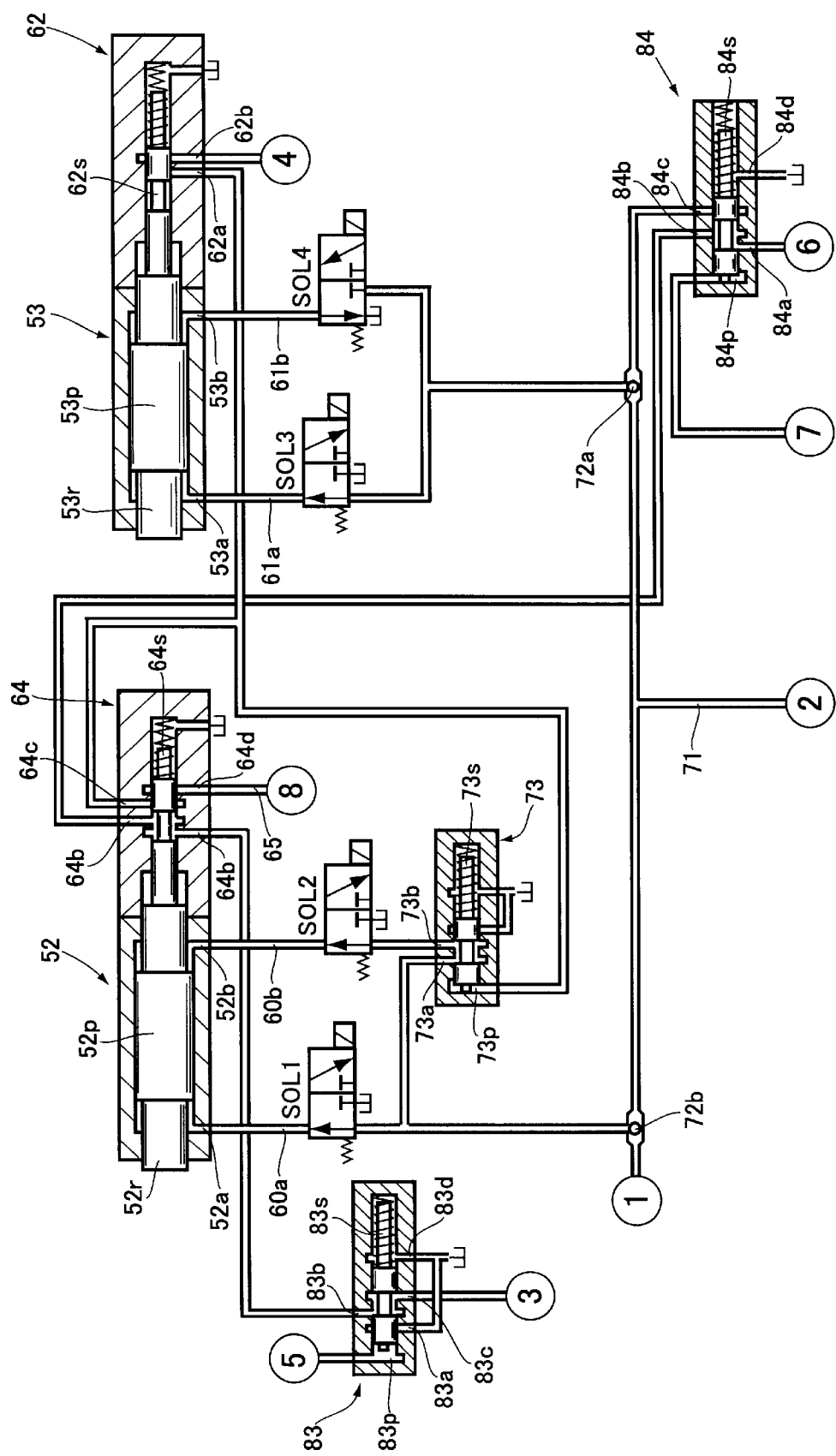
FIG. 5 is a hydraulic circuit diagram showing the hydraulic control apparatus of the automatic transmission.

FIGS. 4 and 5 are both hydraulic circuit diagrams for the automatic transmission. FIG. 4 shows parts controlling each operation of the input clutch 17 and of the two bypass clutches 31, 32, and also FIG. 5 shows the parts controlling each operation of the shift actuator 52 and select actuator 53. In the hydraulic circuit diagrams, each circuit is connected by each portion with corresponding reference numerals 1 to 8.

A select lever (not shown) operated by the driver is provided in a vehicle compartment, and a spool valve shaft 55s actuated by the select lever is provided at a manual valve 55. A line pressure oil passage 56 is connected with a line pressure port 55a formed in the manual valve 55, and also a line pressure supply section 57 having a pump and a pressure governor (not shown) for controlling the pressure at a predetermined line pressure. A D port 55b and an R port 55c are further provided in the manual valve 55. The D port 55b communicates with the line pressure port 55a when the manual valve 55 is moved to a position D corresponding to a drive range by the select lever. Also, the R port 55c communicates with the line pressure port 55a when the manual valve 55 is moved to a position R corresponding to the reverse range. A D port oil passage 58 and an R port oil passage 59 for guiding a line pressure thereof, respectively, are connected to the D port 55b and R port 55c. Further, when the manual valve 55 moves to a position N corresponding to a neutral range, the line pressure port 55a, the D port 55b and R port 55c are shut off.

As shown in FIG. 5, the shift actuator 52 has a first piston 52p which is reciprocatable in an axial direction thereof, and ports 52a, 52b which communicate with oil chambers formed on both sides of the piston 52p, respectively. A solenoid valve SOL1 is provided in an actuating oil passage 60a which guides the actuating oil to the port 52a, and also a solenoid valve SOL2 is provided in an actuating oil passage 60b which guides the actuating oil to the port 52b. These two solenoid valves SOL1, SOL2 are both normally open type ones, that is, are normally open solenoid valves. When the solenoid valve SOL1 is energized, and also energization of the solenoid valve SOL2 is cut off, the actuating oil is supplied to the port 52b, and also the actuating oil is discharged from the port 52a, thereby moving the piston 52p of the shift actuator 52 in a leftward direction of FIG. 5. On the other hand, when the solenoid valve SOL2 is energized, and also energization of the solenoid valve SOL1 is cut off, the first piston 52p is moved rightwards. When the energization of the both solenoid valves SOL1, SOL2 is cut off, the oil chambers on both sides of the first piston 52p are then under the same pressure, so that the first piston 52p is held in an intermediate position.

A rod 52r is provided on one end of the piston 52p of the shift actuator 52. When the rod 52r is driven by the first piston 52p in the leftward direction of FIG. 5, the synchronizer sleeves 41b to 43b shown in FIG. 1 can be actuated leftwards via a direction conversion mechanism. In other words, when the actuation is transmitted to the first switching mechanism 41 or the second switching mechanism 42, the transmission gear train can be setted at the first speed or the fourth speed range, respectively. Similarly, when the rod 52r is driven in a rightward direction in FIG. 5, the transmission gear train can be setted at the second speed range, fifth speed or the reverse gear, and when the rod 52r is held at the intermediate position, the synchronizer sleeves 41b to 43b are held at a neutral position in which there is no meshing with the splines 21c, 22c, 24c, 25c, and 27c.

As shown in FIG. 5, the select actuator 53 has a second piston 53p which are reciprocatable in an axial direction thereof, and ports 53a, 53b which communicate with oil chambers formed on both sides of the second piston 53p, respectively. A solenoid valve SOL3 is provided in an actuating oil passage 61a which guides the actuating oil to the port 53a, and also a solenoid valve SOL4 is provided in an actuating oil passage 61b which guides the actuating oil to the port 53b. The solenoid valve SOL3 is of a normally open type, that is, is a normally open solenoid valve, and the solenoid valve SOL4 is the normally closed type, that is, is a normally closed solenoid valve. When these two solenoid valves SOL3, SOL4 are energized, the actuating oil is supplied to the port 53b, and also the the actuating oil is discharged from the port 53a, thereby moving the piston 53p of the select actuator 53 in the leftward direction of FIG. 5. On the other hand, when the energization of the two solenoid valves SOL3, SOL4 is cut off, the piston 53p is moved rightwards. When the energization of the solenoid valve SOL3 is cut off and the solenoid valve SOL4 is energized, the oil chambers on both sides of the piston 53p are then under the same pressure, so that the piston 53p is held in the intermediate position.

A rod 53r is provided at one end of the piston 53p of the select actuator 53. When the rod 53r is driven by the piston 53p in the leftward direction, constituting a forward travel position, of FIG. 5, the first switching mechanism 41 is selected via the direction conversion mechanism, and the action of the shift actuator 52 described above can be transmitted to the first switching mechanism 41. Similarly, when the rod 53r is held at the intermediate position, the second switching mechanism 42 is selected, and also when the rod 53r is driven rightwards to adopt a reverse position, the third switching mechanism 43 is selected.

Further, a select position detection valve 62 is provided adjacent to the select actuator 53. The select position detection valve 62 has a spool valve shaft 62s which is coupled to the piston 53p and provided slidably in an axial direction thereof, where there are further provided an input port 62b to which the line pressure is inputted from the R port 55c of the manual valve 55, and an output port 62a which outputs the line pressure. The spool valve shaft 62s causes the input port 62b and the output port 62a to communicate only when the piston 53p of the select actuator 53 is moved in a rightward direction of FIG. 5, the input port 62b and the output port 62a being shut off at the other positions. That is, the line pressure, which is outputted from the R port 55c of the manual valve 55, is outputted by the output port 62a only when the select actuator 53 transmits a switching actuation to the third switching mechanism 43 to switch to the reverse gear stage.

A shift position detection valve 64 is provided adjacent to the shift actuator 52, and the former has a spool valve shaft 64s which is coupled to the piston 52p and provided slidably in an axial direction. The shift position detection valve 64 is provided with an input port 64c which communicates with the output port 62a of the select position detection valve 62, an output port 64d which supplies the actuating oil to the input clutch 17, an input port 64a to which the line pressure is inputted when such the failure that the solenoid valves SOL1 to SOL8 cannot be energized occurs, and an output port 64b which supplies the line pressure to the select actuator 53 when the failure occurs. The spool valve shaft 64s causes the input port 64a and the output port 64b to communicate only when the piston 52p of the shift actuator 52 is held in the intermediate position of FIG. 5, and causes the input port 64c and the output port 64d to communicate at the other positions. In other words, when the switching mechanisms 41 to 43 are positioned at the neutral position thereof, the input port 64a and the output port 64b are caused to communicate, and also, when the transmission gear train is selected by the switching mechanisms 41 to 43, the input port 64c and the output port 64d are caused to communicate.

Between the line pressure supply section 57 and the solenoid valves SOL1 to SOL4 for controlling the shift actuator 52 and the select actuator 53, a fail safe valve 68, which controls the supply of the line pressure during the normal operation and when the failure occurs, is provided. The fail safe valve 68 has a spool valve shaft 68s which is actuated by a pilot pressure and a spring force, and further has input ports 68a, 68f which are connected with the line pressure oil passage 56, an output port 68b which supplies the line pressure when the failure occurs, an output port 68e which supplies the line pressure during the normal operation; and discharge ports 68c, 68d, 68g which discharge the actuating oil. A pilot chamber 68p provided in the fail safe valve 68 is connected with a pilot pressure oil passage 70, which communicates with a pilot pressure supply section 69, the normally closed solenoid valve SOL5 being provided in the pilot pressure oil passage 70. Upon energization of the solenoid valve SOL5, the pilot pressure is supplied to the pilot chamber 68p, and then since the spool valve shaft 68s is moved in a direction opposing the spring, the output port 68b and the discharge port 68c communicate each other, and also the output port 68e and the input port 68f communicate each other. On the other hand, when energization of the solenoid valve SOL5 is cut off, the spool valve shaft 68s is actuated by the spring, so that the input port 68a and the output port 68b communicate each other, and also the output port 68e and the discharge port 68d communicate each other.

An actuating oil passage 71 for guiding the actuating oil to the shift actuator 52 and the select actuator 53 is connected to the output port 68e of the fail safe valve 68. The actuating oil is supplied via a shuttle valve 72a to the solenoid valves SOL3, SOL4 which control the actuation of the select actuator 53, and also the actuating oil is supplied via a shuttle valve 72b to the solenoid valves SOL1, SOL2 which control the actuation of the shift actuator 52.

A forcible reverse shift valve 73, which controls the switching action for the reverse gear stage by the shift actuator 52, is provided between the shuttle valve 72b and the solenoid valve SOL2. The forcible reverse shift valve 73 has a spool valve shaft 73s which is actuated by the pilot pressure and the spring force, an input port 73a to which the actuating oil is inputted from the shuttle valve 72b, and an output port 73b which supplies the actuating oil toward the solenoid valve SOL2. When the pilot pressure is supplied, the spool valve shaft 73s is moved in a direction opposing the spring, so that the input port 73a and the output port 73b are both shut off. On the other hand, when the pilot pressure is shut off, the spool valve shaft 73s is actuated by the spring, so that the input port 73a and the output port 73b communicate each other. A pilot chamber 73p which is provided in this forcible reverse shift valve 73 is in communication with the output port 62a of the select position detection valve 62, and also, when the select actuator 53 is moved to a reverse position in the rightward direction of FIG. 5, the pilot pressure is inputted to the pilot chamber 73p, so that the input port 73a and the output port 73b are shut off.

As shown in FIG. 4, a normally open solenoid valve SOL6 is provided at an actuating oil passage 65a which guides the actuating oil to the input clutch 17. An actuating oil passage 65b is connected between the actuating oil passage 65a and an actuating oil passage 65 which guides the actuating oil from the output port 64d of the shift position detection valve 64, where shuttle valves 72c, 72d are provided at each connection port. In addition, an input clutch pressure change-over valve 74, which controls the supply of the actuating oil to the actuating oil passage 65a when the failure occurs, is provided between the actuating oil passage 65a and the D port 55b of the manual valve 55.

The input clutch pressure change-over valve 74 has a spool valve shaft 74s which is actuated by the pilot pressure and the spring force, and further is provided with an output port 74a which supplies the actuating oil to the input clutch 17 via the shuttle valve 72c, an input port 74b which communicates with the D port oil passage 58, an input port 74c which inputs the actuating oil of the input clutch 17 when the failure occurs, and an output port 74d which supplies the actuating oil to the input clutch 17 when the failure occurs. When the pilot pressure is supplied to the input clutch pressure change-over valve 74, the spool valve shaft 74s slides in the direction opposing the spring so that the input port 74c and the output port 74d communicate each other. On the other hand, when the pilot pressure is shut off and the actuating oil of a pilot chamber 74p is discharged, the spool valve shaft 74s slides by the spring, and the input port 74b and the output port 74a communicate each other.

A normally closed solenoid valve SOL7 is provided between the first bypass clutch 31 and the D port oil passage 58. A shuttle valve 72e is provided at an actuating oil passage 76 which connects the first bypass clutch 31 with the solenoid valve SOL7, and through the energization of the solenoid valve SOL7, the line pressure supplied from the D port 55b of the manual valve 55 is supplied to the first bypass clutch 31 via the actuating oil passage 76.

In addition, the normally closed solenoid valve SOL8 is provided between the second bypass clutch 32 and the D port oil passage 58. A shuttle valve 72f is provided in an actuating oil passage 77 connecting the second bypass clutch 32 with the solenoid valve SOL8, and also a fail safe bypass valve 78 for controlling the supply of the actuating oil of the bypass clutches 31, 32 is provided between the shuttle valve 72f and the second bypass clutch 32.

The fail safe bypass valve 78 has a spool valve shaft 78s which is actuated by the pilot pressure and the actuating oil line pressure, and further is provided with discharge ports 78a, 78d which discharge the actuating oil, an output port 78b which supplies the actuating oil to the second bypass clutch 32, an input port 78c connected with the actuating oil passage 77, a control port 78e connected with an actuating oil passage 77b branching from the actuating oil passage 77, and a control port 78f which is connected with a control oil passage 76a branching from the actuating oil passage 76 being connected with the first bypass clutch 31. Further, the line pressure oil passage 56 is connected with a pilot chamber 78p which is provided in the fail safe bypass valve 78.

The spool valve shaft 78s of the fail safe bypass valve 78 has valve bodies 79a, 79b of a first pressure-receiving surface area $A_1$, a valve body 79c of a second pressure-receiving surface area $A_2$ which is setted to be between $A_1$ and $2 \cdot A_1$, and a valve body 79d of a third pressure-receiving surface area $A_3$ which is setted to be between $A_1$ and $A_2$. For example, when the D port 55b of the manual valve 55 opens, the solenoid valve SOL7 is energized, and the actuating oil is being supplied to the first bypass clutch 31, the line pressure is applied from the line pressure oil passage 56 to the valve body 79a, and then the line pressure is applied from the control oil passage 76a to the valve body 79d. Thus, a thrust of $A_1 \cdot P_L$ in addition to a spring-biasing force acts on the spool valve shaft 78s in a rightward direction of FIG. 4, and a thrust $(A_1-A_3)P_L$ acts in a leftward direction thereon, and consequently, the spool valve shaft 78s is driven rightwards, so that the input port 78c and the output port 78b communicate each other. Here, $P_L$ is the line pressure.

Also, when the solenoid valve SOL8 is energized, and the actuating oil is supplied to the second bypass clutch 32, the line pressure from the line pressure oil passage 56 acts on the valve body 79a, the line pressure from the actuating oil passage 77 acts on the valve bodies 79a, 79b, and the line pressure from the control oil passage 77b acts on the valve bodies 79c, 79d. Therefore, the thrust of $3A_1 \cdot P_L$ acts rightwards on the spool valve shaft 78s, and the thrust of $(A_1+A_2)P_L$ acts leftwards thereon, and, consequently, the spool valve shaft 78s is driven rightwards. Furthermore, when the two solenoid valves SOL8, SOL7 are energized, the line pressure is applied to the valve body 79d by the control oil passage 76a in addition to the state where the solenoid valve SOL8 alone is energized. In such a situation, the thrust of $3A_1 \cdot P_L$ acts rightwards on the spool valve shaft 78s, and the thrust of $(A_1+A_2+A_3)P_L$ acts leftwards thereon, and consequently, the spool valve shaft 78s is driven leftwards, so that the input port 78c and the output port 78b are shut off, and the output port 78b and the discharge port 78a communicate each other. Thus, as a result of providing the fail safe bypass valve 78, the actuating oil is not supplied simultaneously to the two bypass clutches 31, 32, but the first bypass clutch 31 becomes priority.

As shown in FIG. 3, the energization and shut-off (ON, OFF) of the solenoid valves SOL1 to SOL8 described above are controlled by a control device (ECU) 100. Signals from an inhibitor switch 101, an engine speed sensor 102, a brake switch 103 are inputted to the control device 100. The control device 100 detects the position of the select lever on the basis of a signal from the inhibitor switch 101, the engine speed through a signal from the engine speed sensor 102, a brake operation through the signal from the brake switch 103, and the current vehicle speed and accelerator opening degree through signals from additional sensors. Further, the control device 100 controls the ON and OFF of each of the solenoid valves SOL1 to SOL8 in accordance with drive states of the vehicle and the engine and the range position set by the select lever, based on the detected data, and thus gear-shifting of the automatic transmission.

The following is a description for the operating state of each of the solenoid valves, when the electronic control system is working normally, that is, in a normal travel state. First, in the normal state, when the neutral range is selected using the select lever, that is, the manual valve 55 is set at a position N, the solenoid valve SOL5 is energized, and the line pressure from the line pressure supply section 57 is supplied to the solenoid valve SOL1 via the fail safe valve 68 and the shuttle valve 72b. The line pressure is also supplied to the solenoid valve SOL2 from the shuttle valve 72b via the forcible reverse shift valve 73. The line pressure supplied to the normally open solenoid valves SOL1, SOL2 is supplied to the oil chambers of the shift actuator 52, so that the shift actuator 52 is held in the neutral position thereof. Further, since the D port 55b of the manual valve 55 is shut off, the line pressure is not supplied to the input clutch 17 or the first and second bypass clutches 31, 32. Therefore, in the neutral range, the solenoid valve SOL5 alone is energized, and thus the input clutch 17 maintains an disengaged state without any transmission gear train being selected.

In a normal state, when the drive range is selected using the select lever such that the manual valve 55 is set at the position D, the manual valve 55 is actuated so that the line pressure port 55a and the D port 55b communicate, and consequently, the line pressure is supplied to the input clutch 17 from the D port 55b via the input clutch pressure change-over valve 74, the shuttle valve 72c, and the normally open solenoid valve SOL6. Also, since the line pressure from the D port 55b is supplied to the normally closed solenoid valves SOL7, SOL8 which control the bypass clutches 31, 32 respectively, when the solenoid valve SOL7 is energized, the first bypass clutch 31 is engaged, and also when the solenoid valve SOL8 is energized, the second bypass clutch 32 is engaged. Furthermore, similarly to the neutral range, the line pressure is supplied up to the solenoid valves SOL1 to SOL4, and it is possible to actuate the first and second switching mechanisms 41, 42 by controlling the energization of the solenoid valves SOL1 to SOL4. Therefore, in the drive range, when the solenoid valve SOL5 is energized, and the energization of the solenoid valves SOL1 to SOL4, SOL7, SOL8 is controlled, it is possible to set the transmission gear train to any one of the first to sixth speeds. The engaging or disengaging of the input clutch 17 can be controlled by controlling the energization of the solenoid valve SOL6.

Further, in the normal state, when the reverse range is selected using the select lever so that the manual valve 55 is setted at the position R, the line pressure port 55a and the R port 55c communicate each other, and also the D port 55b is shut off. Consequently, in the drive range, the line pressure, which is supplied to the input clutch 17 and the bypass clutches 31, 32 by the D port 55b, is shut off. In order to perform switching to the reverse gear stage from this stage, the energization of the solenoid valves SOL1, SOL2 is shut off, and the shift actuator 52 is moved to the neutral position. Also, by shutting off the energization of the solenoid valves SOL3, SOL4, the select actuator 53 is moved to the reverse position to select the third switching mechanism 43. Upon actuation of the select actuator 53, the select position detection valve 62 is actuated simultaneously working together therewith, so that the line pressure outputted from the R port 55c is inputted into the pilot chamber 73p of the forcible reverse shift valve 73 via the select position detection valve 62, and then the line pressure supplied to the solenoid valve SOL2 is shut off. When the line pressure of the solenoid valve SOL2 is shut off, the shift actuator 52 causes the third switching mechanism 43 to be actuated from the neutral position to the reverse position for switching to the reverse gear stage. Thus, when the transmission gear train is set at the reverse gear stage through the sequential actuation of the select actuator 53 and the shift actuator 52. The line pressure outputted from the select position detection valve 62 is guided to the actuating oil passage 65 due to the shift position detection valve 64 which is actuated simultaneously working together with the shift actuator 52, and thus supplied to the input clutch 17. In other words, after the switching to the transmission gear train of the reverse gear stage is completed, the input clutch 17 is engaged, and thus the drive power is transmitted to the input shaft 11. Therefore, it is possible to perform the gear shift operation smoothly and reliably.

Hereinafter, explained will be the travel control under the situation where the solenoid valves SOL1 to SOL8 can no longer be energized because of an occurrence of the electrical system failure, that is, when the failure occurs. As shown in FIGS. 4 and 5, a fail mode valve 80, which controls the switching of the line pressure supplied to the shift actuator 52 when the failure occurs, is provided between the line pressure supply section 57 and the solenoid valves SOL1, SOL2. The fail mode valve 80 has a spool valve shaft 80s which is actuated by the pilot pressure and the spring force, and also an actuating oil passage 71 is connected to a pilot chamber 80p and communicates with the output port 68e of the fail safe valve 68. Further, the fail mode valve 80 is provided with discharge ports 80a, 80f, 80h for discharging the actuating oil, an input port 80d to which the line pressure is inputted through the line pressure oil passage 56, an output port 80e which is connected with the actuating oil passage 82 for guiding the line pressure toward the shift actuator 52 when the failure occurs, and an input port 80g which inputs the oil pressure for actuating the spool valve shaft 80s.

The spool valve shaft 80s of the fail mode valve 80 has valve bodies 81a, 81e of a pressure-receiving surface area $A_4$, and valve bodies 81b to 81d of a larger pressure-receiving surface area $A_5$ than $A_4$. Therefore, in the normal travel drive range in which the pilot pressure is supplied into the pilot chamber 80p at any time due to the energization of the SOL5, a thrust of $A_5 \cdot P_L$ acts in a rightward direction of FIG. 4 on the spool valve shaft 80s, and a thrust of kl acts in a leftward direction thereon. In a normal travel reverse range, in addition to the state in the drive range, the line pressure is inputted from the R port 55c to the input port 80g, and thus a thrust of $A_4 \cdot P_L$ acts in a rightward direction on the spool valve shaft 80s, and a thrust of kl acts in the leftward direction thereon. Here, k is a spring constant, l is a spring displacement amount, and $P_L$ is the line pressure. Since the spring constant is setted to be smaller than $(A_5-A_4)P_L/1$, the spool valve shaft 80s is moved rightwards in a normal state.

In the drive range, a thrust of $(A_5-A_4)P_L$ acts in a rightward direction of FIG. 4 on the spool valve shaft 80s when the failure occurs, and a thrust of kl acts in a leftward direction thereon, and thus the spool valve shaft 80s is held rightwards. Further, since the line pressure is inputted to the input port 80g upon setting at the reverse range, the thrust acting on the spool valve shaft 80s is only the leftward thrust kl, and thus the spool valve shaft 80s slides leftwards. Therefore, only in the reverse range during the failure, the spool valve shaft 80s of the fail mode valve 80 slides leftwards, the input port 80d and the output port 80e communicate each other, and in the different circumstances, the spool valve shaft 80s slides rightwards so that the input port 80d and the output port 80e are both shut off.

When the transmission gear train is set at any one of the first speed, the second speed, the fourth speed, and the fifth speed, the normally closed solenoid valve SOL5 is turned OFF, and the line pressure of the shift actuator 52 is shut off as a result of the actuation of the fail safe valve 68 in a case where an electrical system failure occurs. However, in the situation, the transmission gear train is maintained during the vehicle travel due to a resistance in meshing with the synchronizer sleeves 41b, 42b and the splines 21c, 22c, 24c, 25c, respectively, and also by using a detent mechanism, so that the vehicle can travel forwards. Also, upon selecting the neutral range by using the select lever, the D port oil passage 58 is closed, and thus the supply of the oil pressure to the input clutch 17 is suspended.

Furthermore, when the transmission gear train is in a reverse gear stage, in the event of a fail state, the spool valve shafts 68s, 80s of the fail safe valve 68 and the fail mode valve 80, respectively, slide in a leftward direction of FIG. 4. During a normal travel, although the line pressure supplied from the output port 68e is shut off, the input port 80d and the output port 80e of the fail mode valve 80 communicate each other, and the line pressure is supplied to the shift actuator 52 via the actuating oil passage 82. At this time, the input port 73a and the output port 73b of the forcible reverse shift valve 73 are shut off. Consequently, the line pressure is supplied only to the normally open solenoid valve SOL1, and thus the shift actuator 52 can maintain the reverse position. Therefore, the vehicle is capable of travelling in the reverse range, and upon selecting the neutral range by using the select lever, the R port oil passage 59 is closed, so that the supply of the oil pressure to the input clutch 17 is suspended.

On the other hand, the transmission gear trains of the third gear and the sixth gear are set by either of the two bypass clutches 31, 32. The two bypass clutches 31, 32 are controlled by the normally closed solenoid valves SOL7, SOL8 respectively, meaning that, during failure, the line pressure of the bypass clutches 31, 32 is discharged, and thus it is no longer possible to maintain the third speed or the sixth speed transmission gear train.

Therefore, as shown in FIGS. 4 and 5, an oil pressure shutoff valve 83 for controlling the supply of the line pressure to the shift position detection valve 64 is provided between the fail safe valve 68 and the shift position detection valve 64. Further, a reverse bypass change-over valve 84 for controlling the supply of the line pressure to the input clutch 17, the two bypass clutches 31, 32, or the select actuator 53, and also a bypass oil passage change-over valve 85 for controlling the supply of the line pressure from the reverse bypass change-over valve 84 to the two shuttle valves 72e, 72f are provided between the shift position detection valve 64 and the two bypass clutches 31, 32.

Provided in the oil pressure shutoff valve 83 are discharge ports 83a, 83d for discharging the actuating oil, an input port 83c, for communicating with the output port 68b of the fail safe valve 68, and an output port 83b for communicating with the input port 64a of the shift position detection valve 64. Further, the oil pressure shutoff valve 83 has a spool valve shaft 83s which is actuated by a pilot pressure and the spring force. When the pilot pressure is supplied thereto, the spool valve shaft 83s is moved in a rightward direction in FIG. 5 so that the input port 83c and the output port 83b communicate. On the other hand, when the pilot pressure is shut off therefrom, the spool valve shaft 83s is moved leftwards by the spring force so that the input port 83c and the output port 83b are shut off. A pilot chamber 83p of the oil pressure shutoff valve 83 communicates with the D port oil passage 58 and the R port oil passage 59 via the shuttle valve 72g, and consequently, excepting the neutral range, the pilot pressure is supplied at any time. Therefore, when the failure occurs, upon selecting the drive range or the reverse range, the pilot pressure is supplied to the pilot chamber 83p, and the line pressure is outputted from the output port 68b of the fail safe valve 68, so that the line pressure can be guided to the input port 64a of the shift position detection valve 64.

Further, provided in the reverse bypass change-over valve 84 are a discharge port 84d for discharging the actuating oil, an input port 84b for communicating with the output port 64b of the shift position detection valve 64, an output port 84a for supplying the line pressure to the input port 74c of the input clutch pressure change-over valve 74 and to the bypass oil passage change-over valve 85, and an output port 84c for supplying the line pressure to the select actuator 53. Further, the reverse bypass change-over valve 84 has a spool valve shaft 84s which is actuated by the pilot pressure and the spring force. When the pilot pressure is supplied thereto, the spool valve shaft 84s is actuated in the rightward direction of FIG. 5 so that the input port 84b and the output port 84c communicate each other. On the other hand, when the pilot pressure is shut off therefrom, the spool valve shaft 84s is actuated leftwards so that the input port 84b and the output port 84a communicate. A pilot chamber 84p of the reverse bypass change-over valve 84 communicates with the R port oil passage 59, and thus in the reverse range, the pilot pressure is supplied at any time, and also, when the reverse range is canceled, the supply of the pilot pressure is canceled. Therefore, when the actuation to the reverse range is performed and the line pressure is outputted from the output port 64b of the shift position detection valve 64, it is possible to supply the line pressure toward the select actuator 53. Also, when operation to the neutral or the drive range is performed and the line pressure is outputted from the output port 64b, the line pressure can be supplied toward the input clutch 17 and the two bypass clutches 31, 32.

Provided in the bypass oil passage change-over valve 85 are discharge ports 85b, 85f, 85h for discharging the actuating oil, an input port 85a for communicating with the actuating oil passage 77, an input port 85i for communicating with the actuating oil passage 76, and an input port 85d for communicating with the output port 84a of the reverse bypass change-over valve 84. Further, provided in the bypass oil passage change-over valve 85 are an output port 85c for supplying the line pressure to the first bypass clutch 31 via the shuttle valve 72e, an output port 85e for supplying the line pressure to the second bypass clutch 32 via the shuttle valve 72f, and an input port 85g for supplying the line pressure from the output port 80c of the fail mode valve 80. In addition, the bypass oil passage change-over valve 85 has a spool valve shaft 85s which is actuated by the line oil pressure and the spring force. When the line pressure is supplied to the input port 85a, the spool valve shaft 85s is actuated in a rightward direction of FIG. 4, and also when the line pressure is supplied to the input port 85i, the spool valve shaft 85s is actuated leftwards. Therefore, during the normal travel, upon setting at the third speed range, the spool valve shaft 85s of the bypass oil passage change-over valve 85 is actuated leftwards, so that the input port 85d and the output port 85c can communicate, and, upon setting at the sixth speed range, the spool valve shaft 85s is actuated rightwards, so that the input port 85d and the output port 85e can communicate each other. Moreover, the input port 85g is provided to apply a thrust in the rightward direction onto a valve body 85j when the spool valve shaft 85s is actuated rightwards due to applying the line pressure onto the input port 85a. In other words, even if the line pressure of the input port 85a is shut off, the spool valve shaft 85s can be held rightwards with opposing against the spring force through the provision of the input port 85g.

Under such a hydraulic circuit, when the fail state occurs during the travel with the transmission gear train setted at third speed range, the energization of the normally closed solenoid valves SOL5, SOL7 is shut off, and thus the supply of line pressure of the first bypass clutch 31 is also shut off. As a result, the spool valve shaft 68s of the fail safe valve 68 is actuated leftwards. Next, the movement direction of each of the spool valve shafts 64s, 83s to 85s at this time will be explained referring to FIGS. 4 and 5. The oil pressure shutoff valve 83 is actuated rightwards, and the shift position detection valve 64 is actuated at the neutral position, since the pilot pressure is supplied by the D port oil passage 58. The reverse bypass change-over valve 84 is actuated leftwards since a pilot pressure is shut off as a result of shutting off the R port oil passage 59. Further, the bypass oil passage change-over valve 85 is actuated leftwards due to the first bypass clutch 31 being engaged, respectively. Therefore, after the failure occurred, the line pressure is sequentially guided from the line pressure supply section 57 through the input port 68a of the fail safe valve 68, the output port 68b thereof, the input port 83c of the oil pressure shutoff valve 83, the output port 83b thereof, the input port 64a of the shift position detection valve 64, the output port 64b thereof, the input port 84b of the reverse bypass change-over valve 84, the output port 84a thereof, the input port 85d of the bypass oil passage change-over valve 85, the output port 85c thereof, and then to the shuttle valve 72e. Lastly, the line pressure is thus supplied to the first bypass clutch 31, thereby allowing the travel in the third speed range.

On the other hand, when the fail state occurs during the travel set at the sixth speed, the line pressure is supplied up to the bypass oil passage change-over valve 85, similarly to the situation of the third speed range as mentioned above. However, the spool valve shaft 85s is actuated rightwards here since it is engaged with the second bypass clutch 32. Therefore, the line pressure supplied to the input port 85d can be supplied to the second bypass clutch 32 via the output port 85e, the shuttle valve 72f, and the fail safe bypass valve 78, thereby allowing the travel in the sixth speed range. When the neutral range is selected by using the select lever under this state, the D port oil passage 58 is closed, and thus the supply of the oil pressure to the input clutch 17 is suspended.

When it is assumed that the fail state occurs during forward or reverse travel under such a hydraulic control circuit, the setted transmission gear train can be maintained in spite of the fail state. Upon operating the select lever to the neutral range under the situation, the input clutch 17 is disengaged, so that the drive power of the input shaft 11 can be shut off.

Figure 6:
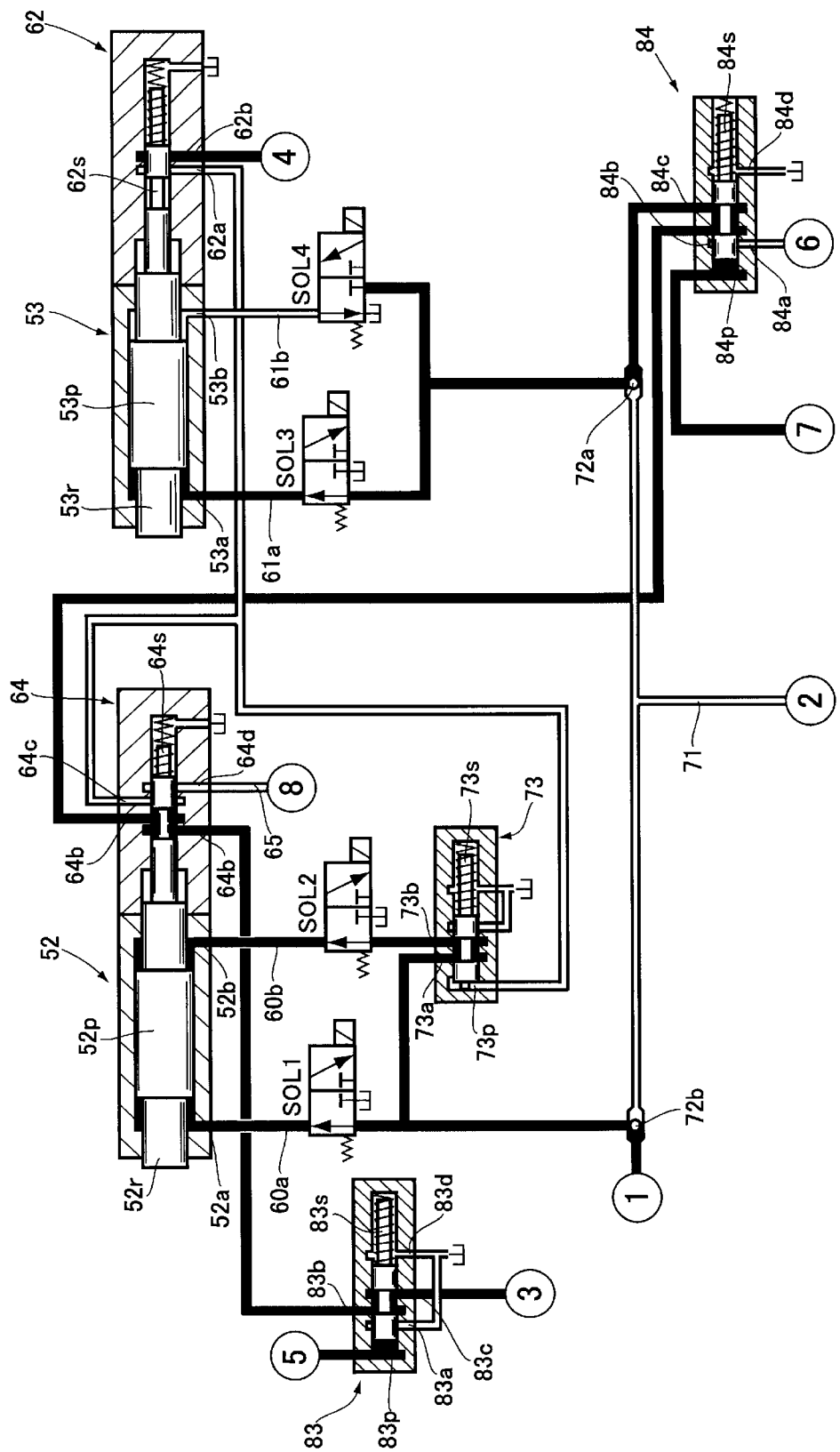
FIG. 6 is the hydraulic circuit diagram with the same parts as FIG. 5, showing line pressure transmission routes in a case where a reverse range is selected after an electrical system failure has occurred.
Figure 7:
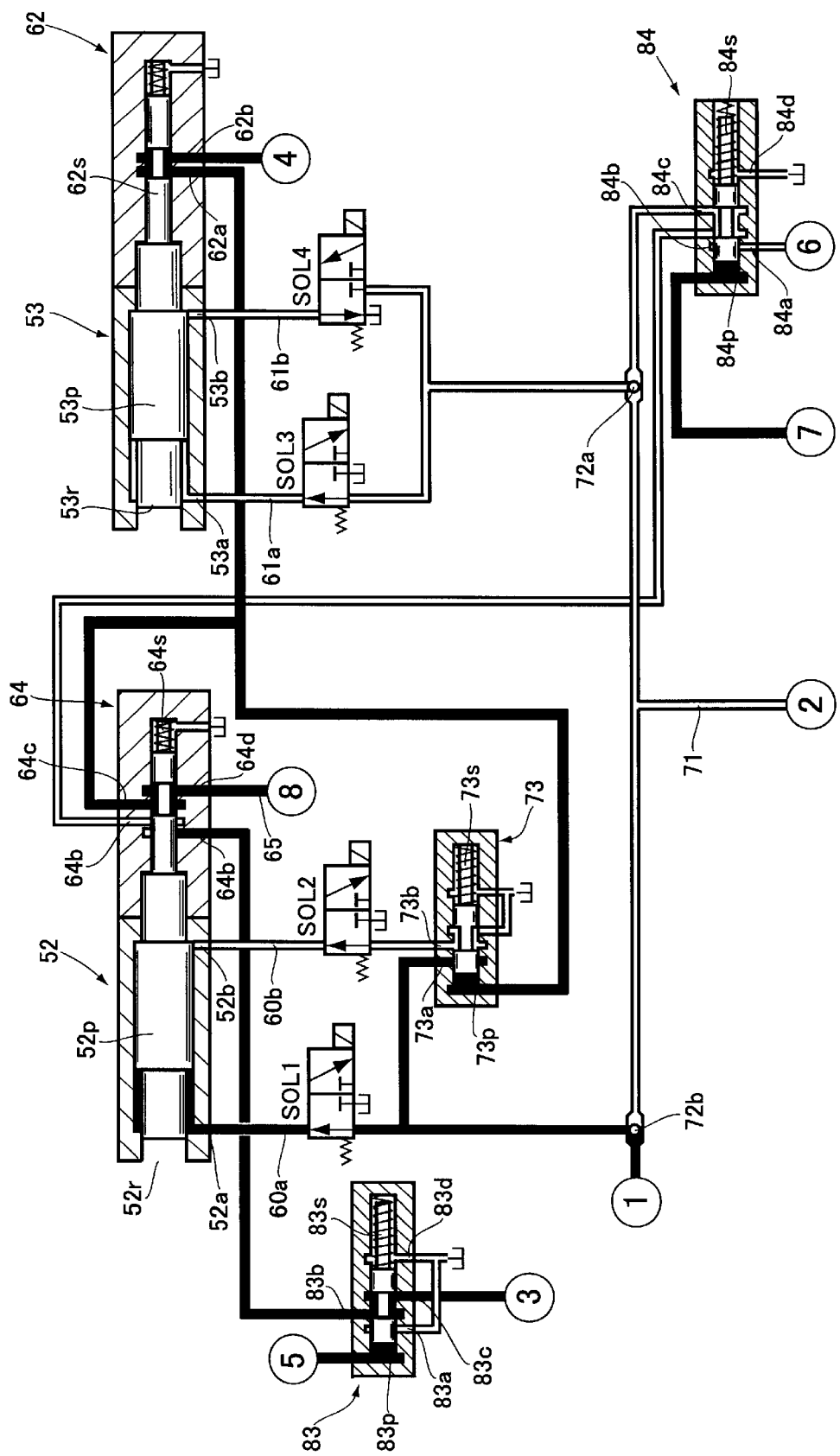
FIG. 7 is the hydraulic circuit diagram with the same parts as FIG. 5, showing the line pressure transmission routes in the case where the reverse range is selected after the electrical system failure has occurred.
Figure 8:
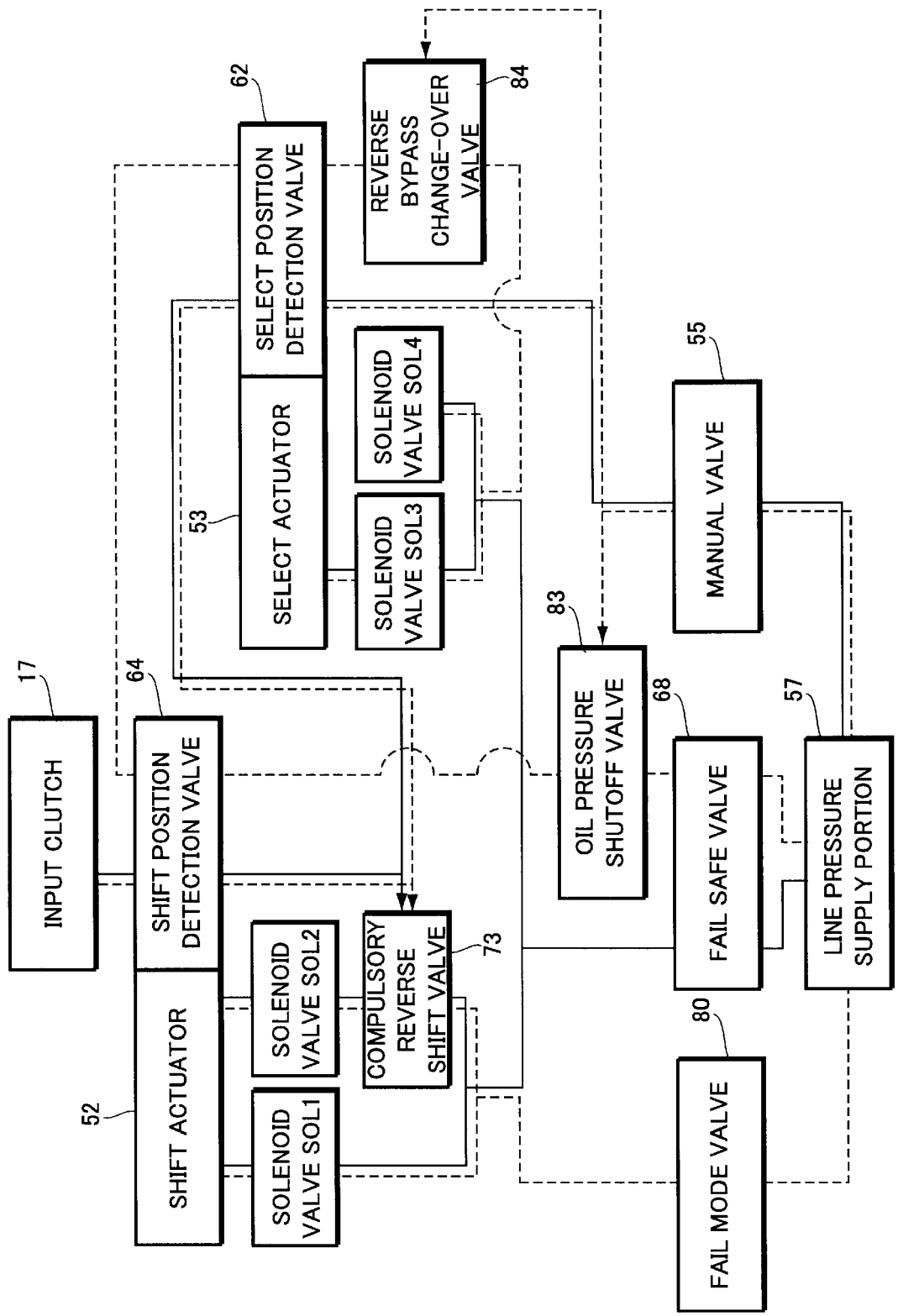
FIG. 8 is the schematic view showing the both of line pressure transmission routes when the reverse range is selected during normal operation and when a failure occurs.

Hereinafter, explained will be the forward travel and reverse travel following the failure, which are under the situation where the select lever is operated from the neutral range to the reverse range, and also from the reverse range to the drive range via the neutral range, respectively. FIG. 6 is a hydraulic circuit diagram showing line pressure transmission passages from the operational completion of the select lever to the reverse range until the select actuator 53 begins to be actuated to the reverse position, and also FIG. 7 is a hydraulic circuit diagram showing line pressure transmission passages from the state of FIG. 6 until the engagement of the input clutch 17. Some lines with dark colors of FIGS. 6 and 7 are line pressure transmission passages. Further, FIG. 8 is a schematic view showing line pressure transmission passages under the situation where the reverse range is selected during the normal operation and during the failure, respectively, where the transmission passages during the normal operation are shown by using solid lines, and transmission passages during the failure are shown by using broken lines. Further, the passages indicated by the arrows in FIG. 8 are the passages for supplying the line pressure which works as the pilot pressure.

As for the state of the automatic transmission in the neutral range, as described heretofore, this is a state in which the transmission gear train during the failure is maintained and only the input clutch 17 is disengaged. When the vehicle stops, and the select lever is operated into the reverse range under this state, the manual valve 55 is actuated so that the line pressure port 55a and the R port 55c communicate, and then the line pressure is supplied to the R port oil passage 59. Also, as shown in FIG. 6, the spool valve shafts 83s, 84s of the oil pressure shutoff valve 83 and the reverse bypass change-over valve 84 which have the pilot chambers 83p, 84p that communicate with the R port oil passage 59, respectively, are both actuated in a rightward direction of FIG. 6. Further, as a result of the oil pressure being supplied to the R port oil passage 59, the line pressure is applied to the input port 80g of the fail mode valve 80, so that the spool valve shaft 80s is actuated leftwards. Furthermore, the line pressure is supplied up to the input port 62b of the select position detection valve 62 which communicates with the R port oil passage 59.

Through the actuation of the oil pressure shutoff valve 83, the line pressure supplied via the fail safe valve 68 is supplied up to the input port 64a of the shift position detection valve 64 via the oil pressure shutoff valve 83. Then, since the fail mode valve 80 is actuated by the spring force, the line pressure of the line pressure oil passage 56 is supplied to the shift actuator 52 via the fail mode valve 80 and then the shuttle valve 72b. Here, the pilot pressure is not supplied from the select position detection valve 62 to the forcible reverse shift valve 73 which is provided upstream of the solenoid valve SOL2, thereby allowing the input port 73a and the output port 73b to communicate each other. Therefore, the line pressure supplied to the shift actuator 52 through the actuation of the fail safe valve 68 actuates the shift actuator 52 to the neutral position thereof via the normally open solenoid valves SOL1, SOL2. Further, due to the actuation of the fail mode valve 80, the pilot pressure is supplied to the input clutch pressure change-over valve 74 so that the spool valve shaft 74s is actuated in a rightward direction of FIG. 4.

When the shift actuator 52 is actuated to the neutral position, the input port 64a and the output port 64b of the shift position detection valve 64 communicate each other, and consequently, the line pressure supplied via the oil pressure shutoff valve 83 is supplied to the input port 84b of the reverse bypass change-over valve 84 via the shift position detection valve 64. In this case, the input port 84b and the output port 84c of the reverse bypass change-over valve 84 communicate each other, and the line pressure is supplied to the select actuator 53 via the reverse bypass change-over valve 84 and the shuttle valve 72a. Here, since the solenoid valve SOL3 is normally open whereas the solenoid valve SOL4 is normally closed, the line pressure is supplied to port 53a alone via the solenoid valve SOL3. Thus, the select actuator 53 is actuated to the reverse position which transmits a switching action to the third switching mechanism 43.

As shown in FIG. 7, when the select actuator 53 is actuated to the reverse position, the input port 62b and the output port 62a of the select position detection valve 62 communicate each other, and consequently, the line pressure supplied from the R port oil passage 59 is inputted to the pilot chamber 73p of the forcible reverse shift valve 73, thereby shutting off the communicated input port 73a and the output port 73b. Therefore, the line pressure of the shift actuator 52 is supplied only from the normally open solenoid valve SOL1, so that the shift actuator 52 is held in the neutral position is actuated to a reverse position, and thus the transmission gear train is set at the reverse gear stage.

When the shift actuator 52 is actuated to the reverse position, the input port 64c and the output port 64d of the shift position detection valve 64 communicate, and therefore, the line pressure supplied from the select position detection valve 62 is supplied to the input clutch 17 via the two shuttle valves 72d, 72c and the normally open solenoid valve SOL6. Thus, even during the failure, the reverse travel is permitted by operating the select lever to the reverse range. Furthermore, even in the conditions where the control of the energization of the solenoid valves SOL1 to SOL4, SOL6 is not possible, the switching action of the select actuator 53 can be performed after the shift actuator 52 is setted at the neutral position, and then the input clutch 17 can be engaged after the switching action of the shift actuator 52 is completed, whereby it is possible to prevent gear clashes and also to reliably perform the switching action to the reverse gear stage.

Next, explained will be action conditions at the time of performing an operation from the reverse range to the drive range via the neutral range. When the select lever is operated to the neutral range, the manual valve 55 is actuated so that the R port 55c communicating with the line pressure port 55a is shut off. The pilot pressure of the forcible reverse shift valve 73, which is supplied from the R port oil passage 59 via the select position detection valve 62, is shut off, and thus, the spool valve shaft 73s is actuated leftwards. Furthermore, the supply of the line pressure of the input clutch 17 supplied via the shift position detection valve 64 is also shut off, and then the input clutch 17 enters a release state. Further, since the pilot pressure of the oil pressure shutoff valve 83 and the reverse bypass change-over valve 84 is also shut off, the spool valve shafts 83s, 84s are both actuated leftwards. Then, through the actuation of the forcible reverse shift valve 73, the line pressure of the normally open solenoid valve SOL2 shut off for the moment is supplied, so that the shift actuator 52 is actuated to the neutral position.

When the select lever is actuated to the drive range, the manual valve 55 is actuated so that the line pressure port 55a and the D port 55b communicate, and then the line pressure is supplied to the D port oil passage 58. The spool valve shaft, of the oil pressure shutoff valve 83 having a pilot chamber 83p which communicates via the shuttle valve 72g with the D port oil passage 58, is thus actuated rightwards.

As a result of the actuation of the oil pressure shutoff valve 83, the line pressure supplied to the oil pressure shutoff valve 83 via the fail safe valve 68 is supplied to the reverse bypass change-over valve 84 via the shift position detection valve 64 due to the neutral position action of shift actuator 52. In this case, the pilot pressure is not supplied to the reverse bypass change-over valve 84, and the line pressure is supplied, via the output port 84a, to the input port 85d of the bypass oil passage change-over valve 85, and to the input port 74c of the input clutch pressure change-over valve 74, respectively. The pilot pressure is not supplied to the bypass oil passage change-over valve 85, and the line pressure of the input port 85d is supplied from the output port 85c to the first bypass clutch 31 via the shuttle valve 72e. On the other hand, since the pilot pressure is inputted from the output port 80e of the fail mode valve 80 to the input clutch pressure change-over valve 74, the line pressure of the input port 74c is supplied to the input clutch 17 via the output port 74d, the shuttle valves 72d, 72c, and the normally open solenoid valve SOL6. Thus, during the failure, upon operating the select lever from the reverse range to the drive range via the neutral range, a limp home control is performed, so that the travel using the third speed range becomes possible irrespective of the state of the transmission gear train selected prior to the failure.

Taken together, the operations of the hydraulic control apparatus when the reverse range is selected during the failure, are as follows. First, when the shift actuator 52 is actuated to the neutral position for releasing the switching mechanisms 41 to 43, the actuating oil is supplied toward the select actuator 53 from the shift position detection valve 64 for switching the oil passage by simultaneously working together with the shift actuator 52. The normally open solenoid valve SOL3 and the normally closed solenoid valve SOL4 are provided respectively in the two actuating oil passages 61a, 61b which actuate the select actuator 53, and also the actuating oil is supplied to the select actuator 53 via the normally open solenoid valve SOL3 alone. Upon the actuation of the select actuator 53 to the reverse position for selecting the third switching mechanism 43, the actuating oil is supplied to the pilot chamber 73p of the forcible reverse shift valve 73 from the select position detection valve 62 which opens/closes the oil passage under the working together with the select actuator 53. The spool valve shaft 73s of the forcible reverse shift valve 73 is actuated so that the actuating oil supplied to the port 52b of the shift actuator 52 is shut off, and consequently, the actuating oil is then supplied to one oil chamber alone via the port 52a of the shift actuator 52, thereby allowing the shift actuator 52 to actuate the third switching mechanism 43 and to set the transmission gear train to the reverse gear stage. When actuating the shift actuator 52 to the reverse position that sets the reverse gear stage, the shift position detection valve 64 switches the oil passage, so that the actuating oil outputted from the select position detection valve 62 is supplied to the input clutch 17, the input clutch 17 is engaged, and thus the vehicle travels in reverse. Thus, in a state where all the switching mechanisms 41 to 43 are released, the select actuator 53 is actuated, and after the third switching mechanism 43 is actuated and completes a switching action to the reverse gear stage, it is possible to engage the input clutch 17, and consequently, the travel is permitted by the reliable switching to the reverse gear stage without gear clashes or interlocking.

The present invention is not limited by the aforementioned embodiment, a variety of modifications being possible within the scope of the present invention without departing from the spirit thereof. For example, the two bypass clutches 31, 32 have been provided on the input shaft 11 and the output shaft 12, respectively, but the two bypass clutches 31, 32 may also be provided on the input shaft 11, or similarly on the output shaft 12. As for the transmission gear train switching mechanisms 41 to 43, a synchromesh mechanism has been employed, but a dog clutch switching mechanism may also be employed. In the embodiment shown in the drawings, there are setted six forward travel stages, but the gear shift stages can be an arbitrary number of stages. Moreover, the third speed range is setted by the first bypass clutch, and the sixth speed range is setted by the second bypass clutch, but the setting of these transmission gear trains are not limited to such a way. Although the automatic transmission shown in the drawings has been applied to a four-wheel drive vehicle, the present invention can also be applied to FF vehicles and FR vehicles. The automatic transmission may be disposed in a longitudinal direction or a horizontal direction in the engine room.

Moreover, the embodiment of the present invention have a structure to comprise two bypass clutches 31, 32, but a structure having one bypass clutch is also possible. In such a case, the structure may be formed such that the bypass oil passage change-over valve 85 and the fail safe bypass valve 78 are omitted, and the oil passage is connected from the reverse bypass change-over valve 84 to the bypass clutch via the shuttle valve.

According to the present invention, it is possible to actuate the select actuator to the reverse position after the shift actuator is actuated to the neutral position, and then to engage the input clutch after the shift actuator is actuated to the reverse position, and thus it is possible to reliably perform switching to the transmission gear train for the backward travel without the gear clashes or interlocking.

In addition, according to the present invention, even in a case where the solenoid valve for switching the transmission gear train is no longer operating due to an electrical system failure, it is possible to actuate the select actuator to the reverse position after the shift actuator is actuated to the neutral position, and to engage the input clutch after the shift actuator is actuated to a reverse position by performing a manual operation. Therefore, it is possible to reliably perform switching to a transmission gear train for the backward travel without the gear clashes or interlocking.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. A hydraulic control apparatus of an automatic transmission having an input shaft with a plurality of drive gears, an output shaft with a plurality of driven gears to form transmission gear trains by meshing with the drive gears, and a plurality of switching mechanisms for switching said transmission gear trains from said input shaft to said output shaft, comprising:

an input clutch for engaging and disengaging between an engine and said input shaft;

a select actuator for selecting either one of said plurality of switching mechanisms to perform a switching operation;

a shift actuator for performing the switching operation of said selected switching mechanism;

a select position detection valve for opening and closing an oil passage under an engagement with said select actuator;

a shift position detection valve for switching the oil passage under an engagement with said shift actuator, said shift position detection valve supplying an oil pressure for switching into a reverse gear stage to said select actuator when said shift actuator is actuated to a neutral position; and a forcible reverse shift valve for setting said shift actuator at a reverse gear stage by the oil pressure from said select position detection valve when said select actuator is switched to a reverse position, wherein the oil pressure is supplied to said input clutch via said shift position detection valve when the reverse gear stage is set by said shift actuator.

2. The hydraulic control apparatus of an automatic transmission according to claim 1, further comprising:

a normally open solenoid valve for controlling a supply of the oil pressure to allow said select actuator to be actuated to the reverse position; and a normally closed solenoid valve for controlling said supply of the oil pressure to allow said select actuator to be actuated to a forward travel position.

* * * * *